United States Patent
Higuchi et al.

(10) Patent No.: US 10,379,513 B2
(45) Date of Patent: Aug. 13, 2019

(54) MONITORING SYSTEM, MONITORING DEVICE, AND MONITORING METHOD

(71) Applicant: OMRON Corporation, Kyoto (JP)

(72) Inventors: Toshiyuki Higuchi, Kusatsu (JP); Tetsuya Akagi, Kyoto (JP); Yoshiharu Tani, Kusatsu (JP); Ikuo Matsukawa, Tokyo (JP)

(73) Assignee: OMRON Corporation, Kyoto (JP)

( * ) Notice: Subject to any disclaimer, the term of this patent is extended or adjusted under 35 U.S.C. 154(b) by 188 days.

(21) Appl. No.: 15/705,279

(22) Filed: Sep. 15, 2017

(65) Prior Publication Data
US 2018/0120804 A1 May 3, 2018

(30) Foreign Application Priority Data

Nov. 1, 2016 (JP) .................. 2016-214062

(51) Int. Cl.
*G05B 19/18* (2006.01)
*G05B 19/042* (2006.01)
(Continued)

(52) U.S. Cl.
CPC ........ *G05B 19/0428* (2013.01); *B25J 9/1676* (2013.01); *B25J 19/06* (2013.01); *F16P 3/14* (2013.01); *G05B 19/4061* (2013.01); *G05B 2219/24024* (2013.01); *G05B 2219/37631* (2013.01); *G05B 2219/40202* (2013.01); *G05B 2219/40203* (2013.01);
(Continued)

(58) Field of Classification Search
None
See application file for complete search history.

(56) References Cited

U.S. PATENT DOCUMENTS 7,623,031 B2 * 11/2009 Haberer .................. F16P 3/144
340/540
7,652,238 B2 * 1/2010 Haberer .................. F16P 3/147
250/206.1
(Continued)

FOREIGN PATENT DOCUMENTS

JP 2007283450 11/2007
JP 5035768 9/2012

OTHER PUBLICATIONS

"Search Report of Europe Counterpart Application", dated Apr. 6, 2018, p. 1-p. 8.

*Primary Examiner* — Bhavesh V Amin
(74) *Attorney, Agent, or Firm* — JCIPRNET

(57) ABSTRACT

A monitoring system, a monitoring device, and a monitoring method that can facilitate designing of a working environment are provided. Positions of a worker and a robot in a three-dimensional space are specified, at least one protection area to secure safe work of the worker and the robot is set, whether at least one of the worker and the robot intrudes into the protection area is determined, the motion of the robot is limited when at least one of the worker and the robot intrudes into the protection area, a protection area for executing the determination is being switched from multiple set protection areas, and it is possible to set the protection area when the worker works in a common area in which a work area of the worker and a work area of the robot overlap and set the protection area when the robot works in the common area.

10 Claims, 14 Drawing Sheets

(51) Int. Cl.
*B25J 19/06* (2006.01)
*F16P 3/14* (2006.01)
*B25J 9/16* (2006.01)
*G05B 19/4061* (2006.01)

(52) U.S. Cl.
CPC .............. *G05B 2219/49137* (2013.01); *G05B 2219/49152* (2013.01); *G05B 2219/49157* (2013.01)

(56) References Cited

U.S. PATENT DOCUMENTS

| | | | |
|---|---|---|---|
| 9,489,730 B2 * | 11/2016 | Doettling | F16P 3/142 |
| 2002/0186299 A1 * | 12/2002 | Cofer | F16P 3/142 |
| | | | 348/152 |
| 2006/0049939 A1 * | 3/2006 | Haberer | F16P 3/142 |
| | | | 340/541 |
| 2008/0021597 A1 * | 1/2008 | Merte | F16P 3/141 |
| | | | 700/255 |
| 2008/0249659 A1 * | 10/2008 | Ueyama | B25J 9/0018 |
| | | | 700/245 |
| 2009/0015663 A1 * | 1/2009 | Doettling | F16P 3/14 |
| | | | 348/46 |
| 2012/0327190 A1 | 12/2012 | Massanell et al. | |
| 2015/0049911 A1 * | 2/2015 | Doettling | F16P 3/142 |
| | | | 382/103 |
| 2018/0120804 A1 * | 5/2018 | Higuchi | G05B 19/0428 |

\* cited by examiner

MONITORING SYSTEM, MONITORING DEVICE, AND MONITORING METHOD

CROSS-REFERENCE TO RELATED APPLICATION

This application claims the priority benefit of Japan application serial no. 2016-214062, filed on Nov. 1, 2016. The entirety of the above-mentioned patent application is hereby incorporated by reference herein and made a part of this specification.

BACKGROUND OF THE INVENTION

Field of the Invention

The present invention relates to a monitoring system, a monitoring device, and a monitoring method that monitor motions of a worker and a robot so that work can be performed safely.

Description of Related Art

In a working environment in which an industrial robot (hereinafter referred to as a "robot") and a worker work together, a principal cause of accidents involving the worker and the robot is a collision of the worker with the robot. In the related art, a technique of constructing a working environment in which a worker and a robot can coexist close to each other while preventing a collision of a worker with a robot has been proposed (Patent Document 1).

In the invention described in Patent Document 1, there is a common area in which a work area of a worker and a work area of a robot overlap (a cooperative space in which both work of a robot and work of a worker are performed). In order to detect intrusion of at least one of the robot and the worker into the common area, a pair of photoelectric safety devices are disposed on the robot side and a pair of photoelectric safety devices is disposed on the worker side.

PRIOR ART DOCUMENT

Patent Document

[Patent Document 1] Japanese Patent No. 5035768

SUMMARY OF THE INVENTION

In Patent Document 1, for example, when a plurality of common areas in which a worker can work are provided around one robot, it is necessary to install a pair of photoelectric safety devices on the robot side and a pair of photoelectric safety devices on the worker side for each of the plurality of common areas. The photoelectric safety devices need to be installed with an appropriate safety distance secured in consideration of a size or a work speed of a robot, a work size, and the like. Accordingly, there is a problem in that designing of a working environment is troublesome.

In consideration of the above-mentioned problem, the present invention provides a monitoring system, a monitoring device, and a monitoring method that can facilitate designing of a working environment in which there is a common area in which a work area of a worker and a work area of a robot overlap.

According to an aspect of the present invention, there is provided a monitoring system having a monitoring device that monitors motions of a worker and a robot so that work can be performed safely, the monitoring system including: at least one three-dimensional detection unit configured to specify positions of the worker and the robot in a three-dimensional space; an area setting unit configured to set at least one protection area to secure safe work of the worker and the robot in spatial coordinates which are recognizable by the three-dimensional detection unit; a determination unit configured to determine whether at least one of the worker and the robot intrudes into the protection area on the basis of the positions of the worker and the robot specified by the three-dimensional detection unit; a limiting unit configured to limit the motion of the robot when the determination unit determines that at least one of the worker and the robot intrudes into the protection area; and a switching unit configured to switch the protection area for executing the determination from a plurality of protection areas when the area setting unit sets the plurality of protection areas, wherein the area setting unit is configured to set the protection area when the worker works in a common area in which a work area of the worker and a work area of the robot overlap and the protection area when the robot works in the common area.

Preferably, the monitoring system further includes a selection switch configured to select the protection area for executing the determination among the plurality of set protection areas, and the switching unit switches the protection area for executing the determination on the basis of the selection switch.

Preferably, the monitoring system further includes a detection area setting unit configured to set a detection area for detecting the position of the robot in the spatial coordinates which are recognizable by the three-dimensional detection unit, the determination unit determines whether the robot is in the detection area on the basis of the position of the robot specified by the three-dimensional detection unit, and the switching unit switches the protection area for executing the determination when the determination unit determines that the robot is located in the detection area.

Preferably, the monitoring system further includes a detection area setting unit configured to set a detection area for detecting the position of the robot in the spatial coordinates which are recognizable by the three-dimensional detection unit, the determination unit determines whether the robot is in the detection area on the basis of the position of the robot specified by the three-dimensional detection unit, and the switching unit stops switching of the protection area when the selection switch is operated but the determination unit determines that the robot is not located in the detection area.

Preferably, the monitoring system further includes a warning area setting unit configured to set a warning area for giving a warning about intrusion of the worker into the protection area outside the protection area in the spatial coordinates which are recognizable by the three-dimensional detection unit.

Preferably, the monitoring system further includes a display unit configured to visually display the protection area set by the area setting unit.

According to another aspect of the present invention, there is provided a monitoring device that monitors motions of a worker and a robot so that work can be performed safely, the monitoring device including: an area setting unit configured to set at least one protection area to secure safe work of the worker and the robot in spatial coordinates which are recognizable by at least one three-dimensional detection unit configured to specify positions of the worker and the robot in a three-dimensional space; a determination unit configured to determine whether at least one of the worker and the robot intrudes into the protection area on the basis of the positions of the worker and the robot specified by the three-dimensional detection unit; a limiting unit configured to limit the motion of the robot when the determination unit determines that at least one of the worker and the robot intrudes into the protection area; and a switching unit configured to switch the protection area for executing the determination from a plurality of protection areas when the area setting unit sets the plurality of protection areas, wherein the area setting unit is configured to set the protection area when the worker works in a common area in which a work area of the worker and a work area of the robot overlap and the protection area when the robot works in the common area.

According to another aspect of the present invention, there is provided a monitoring method of monitoring motions of a worker and a robot so that work can be performed safely, the monitoring method including: a step of setting at least one protection area to secure safe work of the worker and the robot in spatial coordinates which are recognizable by at least one three-dimensional detection unit configured to specify positions of the worker and the robot in a three-dimensional space; a step of determining whether at least one of the worker and the robot intrudes into the protection area on the basis of the positions of the worker and the robot specified by the three-dimensional detection unit; a step of limiting the motion of the robot when it is determined that at least one of the worker and the robot intrudes into the protection area; and a step of switching the protection area for executing the determination from a plurality of protection areas when the plurality of protection areas are set, wherein the protection area when the worker works in a common area in which a work area of the worker and a work area of the robot overlap and the protection area when the robot works in the common area are settable.

The monitoring system, the monitoring device, and the monitoring method according to the present invention can facilitate designing of a working environment in which there is a common area in which a work area of a worker and a work area of a robot overlap.

DESCRIPTION OF THE EMBODIMENTS

Figure 1:
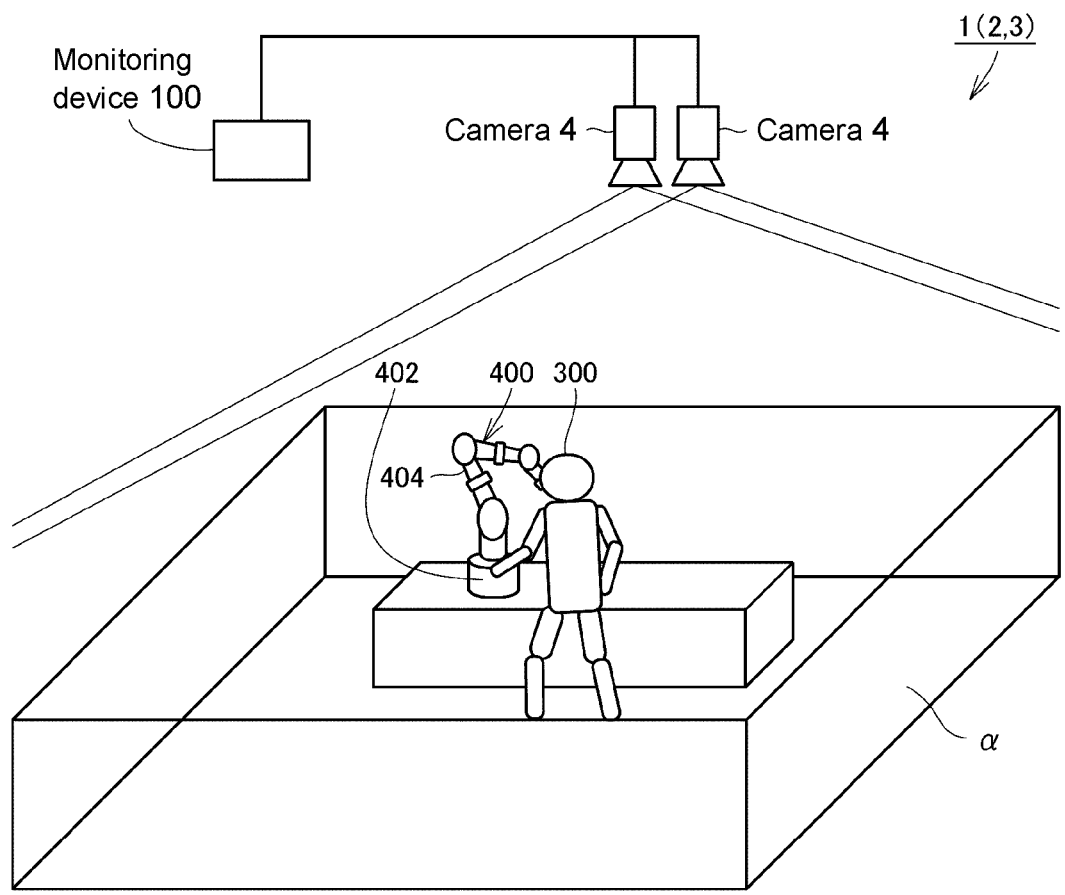
FIG. 1 is a diagram illustrating a configuration example of a monitoring system according to an embodiment.

An embodiment of present invention will be described below in detail with reference to the accompanying drawings. The same or corresponding elements in the drawings will be referenced by the same reference signs and description thereof will not be repeated.

First Embodiment

<Configuration Example of Monitoring System 1>

A configuration example of a monitoring system 1 including a monitoring device according to a first embodiment will be first described below:

FIG. 1 is a diagram illustrating a configuration example of a monitoring system 1 according to this embodiment. Referring to FIG. 1, the monitoring system 1 according to this embodiment includes a monitoring device 100 and two cameras 4 serving as a three-dimensional detection unit.

The monitoring system 1 sets a protection area which will be described later for a worker 300 to work safely in a work area α (a three-dimensional space) in which the worker 300 and a robot 400 work in cooperation with each other and monitors motions of the worker 300 and the robot 400. The robot 400 in this embodiment includes a base 402 and an arm 404. The arm 404 or the like performs an operation in a state in which the robot 400 does not move and is fixed at the spot. By causing the cameras 4 to capture an image (a video) in a three-dimensional space, the monitoring device 100 specifies the position of the worker 300 and the position of the robot 400 in the work area α. Each camera 4 includes an imaging device in addition to an optical system such as a lens. The imaging device includes a charge coupled device (CCD) or a complementary metal oxide semiconductor (CMOS) sensor. Since two cameras 4 are provided, the work area α can be three-dimensionally imaged. A plurality of pairs of cameras (two cameras) may be provided. In the example illustrated in FIG. 1, one robot 400 and one worker 300 are present in the work area α, but two or more robots 400 may be present or two or more workers 300 may be present.

<Example of Hardware Configuration of Monitoring Device 100>

Figure 2:
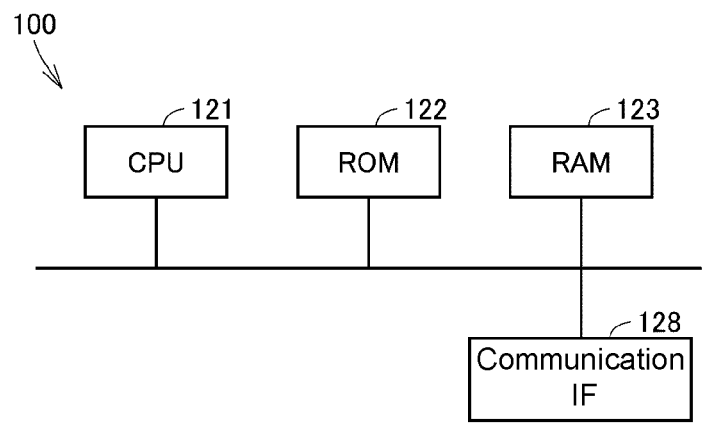
FIG. 2 is a diagram illustrating an example of a hardware configuration of a monitoring device.

FIG. 2 illustrates an example of a hardware configuration of the monitoring device 100. Referring to FIG. 2, the monitoring device 100 includes a central processing unit (CPU) 121 that executes a program, a read only memory (ROM) 122 that stores data in a nonvolatile manner, a random access memory (RAM) 123 that stores data in a volatile manner, and a communication interface (IF) 128 that transmits and receives information. The program or the like which is executed by the CPU 121 is stored in the ROM 122.

<Protection Area>

A protection area will be described below. The protection area is an area in which motions of all robots 400 in the work area α are limited when it is determined that at least one of the worker 300 and the robot 400 intrudes into the protection area. In this way, the protection area is an area for securing safe work of the worker 300 and the robot 400 in a working environment in which there is a common area in which a work area of the worker 300 and a work area of the robot 400 overlap. Limiting of the motion of the robot 400 involves completely stopping the motion of the robot 400. A plurality of protection areas can be set and include, for example, a worker protection area which is set when the worker 300 works in the common area and a robot protection area which is set when the robot 400 works in the common area.

Figure 3:
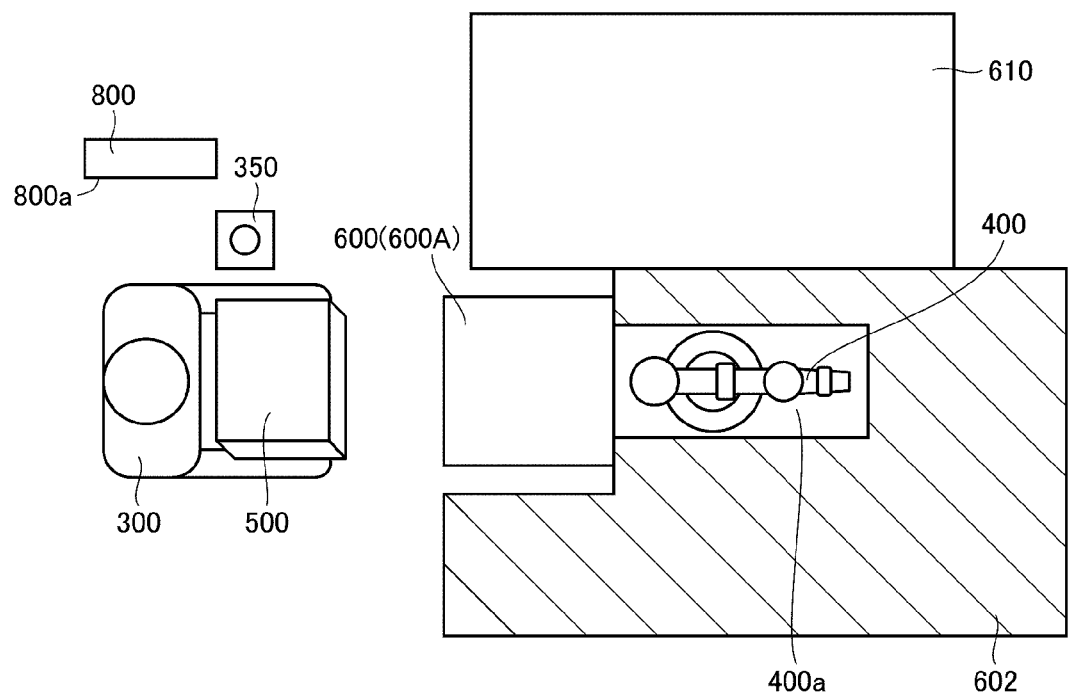
FIG. 3 is a diagram illustrating an example of a worker protection area.

FIG. 3 is a diagram illustrating an example of the worker protection area. In the example illustrated in FIG. 3, the worker 300 holds a work object 500. The work object 500 is an object on which the worker 300 and the robot 400 work. The worker 300 places the work object 500 on the work table 600. The work table 600 is a common area in which the work area of the worker 300 and the work area of the robot 400 overlap. Thereafter, the robot 400 works on the work object 500 placed on the work table 600. In this embodiment, the robot 400 performs work of attaching a label (not illustrated) to the work object 500. The work object 500 to which the work has been completed (that is, the work object 500 to which a label is attached) is moved to a post-work space 610 by a conveyer (not illustrated) or the like.

In the example illustrated in FIG. 3, the work of the worker 300 is "placing the work object 500 on the work table 600." The work of the robot 400 is "attaching a label to the work object 500 placed on the work table 600." The work area of the worker 300 and the work area of the robot 400 overlap on the work table 600 (the common area), and a label can be attached to the work object 500 by sequentially performing the work of the worker 300 and the work of the robot 400. However, when the work of the worker 300 and the work of the robot 400 are performed at the same time on the work table 600, there is a likelihood that a collision between the worker 300 and the robot 400 will occur. Therefore, in order to prevent such a collision, the monitoring device 100 sets a worker protection area in which the motion of the robot 400 is mainly monitored such that the worker 300 can work safely on the work table 600 and a robot protection area in which the motion of the worker 300 is mainly monitored such that the robot 400 can work safely on the work table 600.

In the example illustrated in FIG. 3, a hatched area is a worker protection area 602. The area of the work table 600 is included in an area in which the work area of the worker 300 and the work area of the robot 400 overlap. In the following description, the area of the work table 600 is referred to as a common area 600A. The worker protection area 602 is an area which is virtually set such that the worker 300 and the robot 400 do not collide with each other when the worker 300 works. When the monitoring system 1 determines that at least one of the worker 300 and the robot 400 intrudes into the worker protection area 602, the monitoring system 1 limits motions of all the robots 400 present in the work area α. As illustrated in FIG. 3, the position of the robot 400 which does not work is referred to as an "initial position." The robot 400 illustrated in FIG. 3 is present at the initial position.

The worker protection area 602 in the example illustrated in FIG. 3 is an area excluding an initial position area 400a in which the robot 400 present at the initial position is located from the area opposite to the worker 300 with respect to the work table 600. Accordingly, the monitoring system 1 can determine that the robot intrudes into the worker protection area 602 when the robot 400 starts movement from the initial position.

Figure 4:
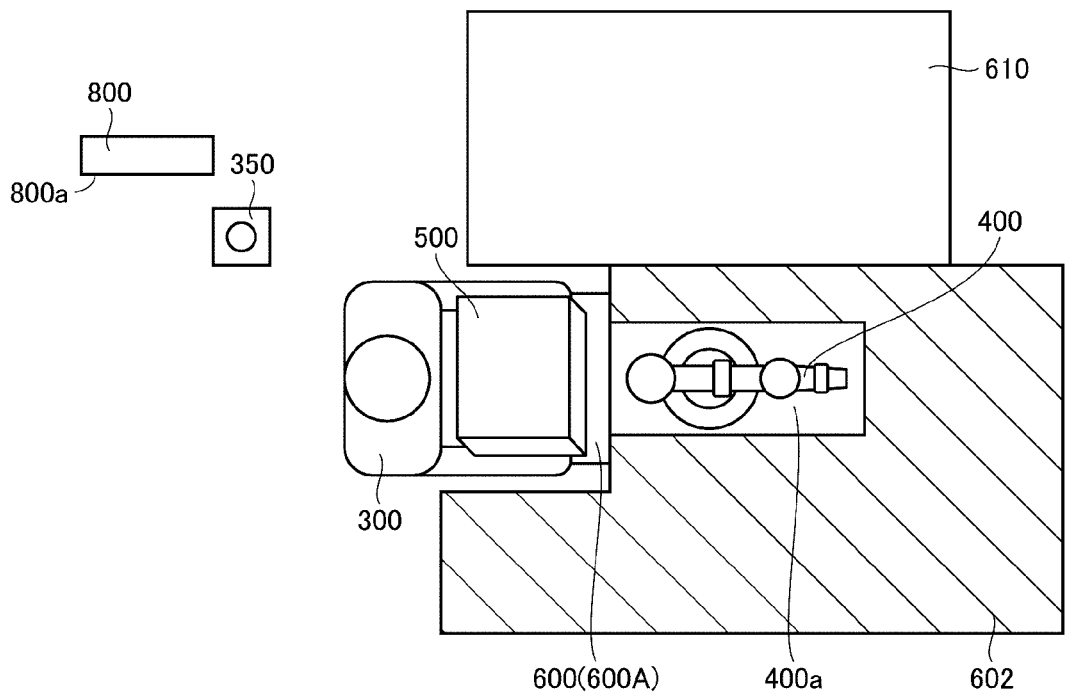
FIG. 4 is a diagram illustrating a state in which a worker places a work object on a work table.

FIG. 4 is a diagram illustrating a state in which the worker 300 places a work object 500 on the work table 600. As illustrated in FIG. 4, in a state in which the worker protection area 602 is set, the worker 300 can work safely (can place the work object 500 on the work table 600) without limiting the motion of the robot 400. In a state in which the worker protection area 602 is set, the robot 400 does not move.

Figure 5:
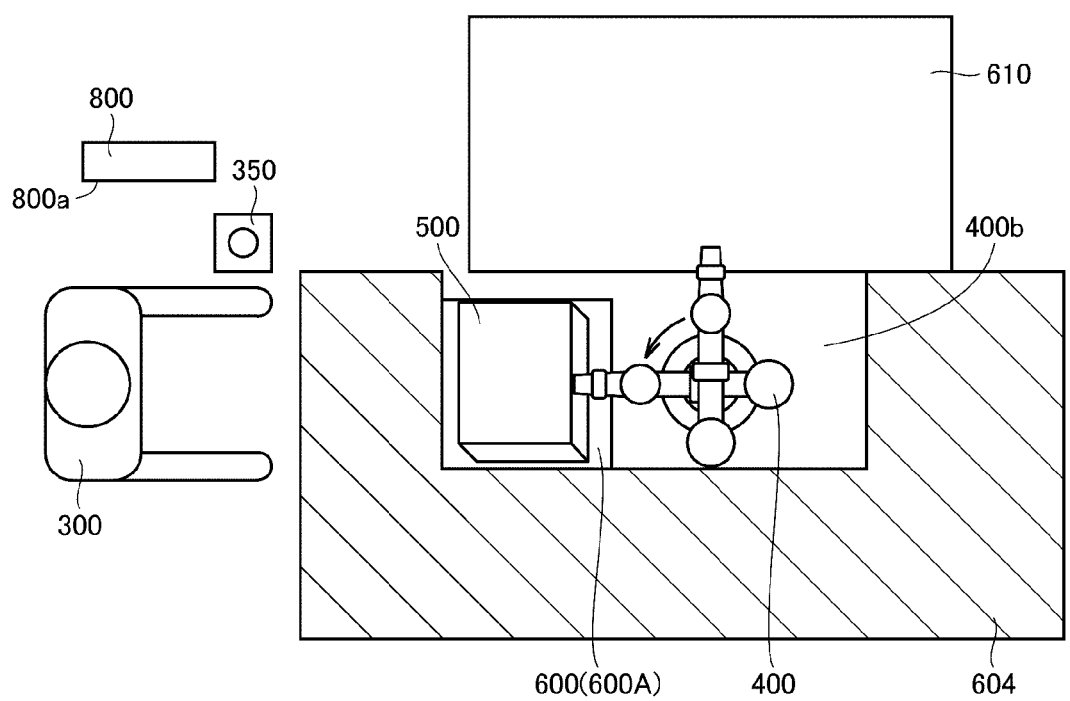
FIG. 5 is a diagram illustrating an example of a robot protection area.

After the worker 300 ends the work (after the worker 300 places the work object 500 on the work table 600), the worker 300 operates the selection switch 350. When the selection switch 350 is operated, the monitoring device 100 switches the worker protection area to the robot protection area. FIG. 5 is a diagram illustrating an example of the robot protection area. In the example illustrated in FIG. 5, a hatched area is a robot protection area 604.

In the example illustrated in FIG. 5, the work object 500 is placed on the work table 600. The robot 400 performs work on the work object 500 placed on the work table 600. The robot protection area 604 is an area which is virtually set such that the robot 400 and the worker 300 do not collide with each other when the robot 400 works. When the monitoring system 1 determines that at least one of the worker 300 and the robot 400 intrudes into the robot protection area 604, the monitoring system 1 limits the motions of all the robots 400 present in the work area α.

The robot protection area 604 in the example illustrated in FIG. 5 is an area excluding the entire area 400b through which the robot 400 passes when the robot works from the area around the robot 400 and the area around the work table 600. Accordingly, the monitoring system 1 does not determine that the robot intrudes into the robot protection area 604 even when the robot 400 moves from the initial position, but can determine that the robot intrudes into the robot protection area 604 when the worker 300 gets close to the circumference of the work table 600.

In this way, the monitoring system 1 according to this embodiment can virtually set one of the worker protection area 602 and the robot protection area 604. The worker protection area 602 is a protection area when the worker 300 works in the common area 600A. The robot protection area 604 is a protection area when the robot 400 works in the common area 600A. A display device 800 is installed in the work area α. The display device 800 is connected to the monitoring device 100. The display device 800 visually displays the set protection area in a display area 800a. For example, as illustrated in FIG. 3, when the worker protection area 602 is set, the display device 800 visually displays the worker protection area 602. When the robot protection area 604 is set, the display device 800 visually displays the robot protection area 604. By including the display device 800, the worker 300 can recognize the set protection area and thus it is possible to enhance safety of work.

<Functional Configuration Example of Monitoring Device 100>

Figure 6:
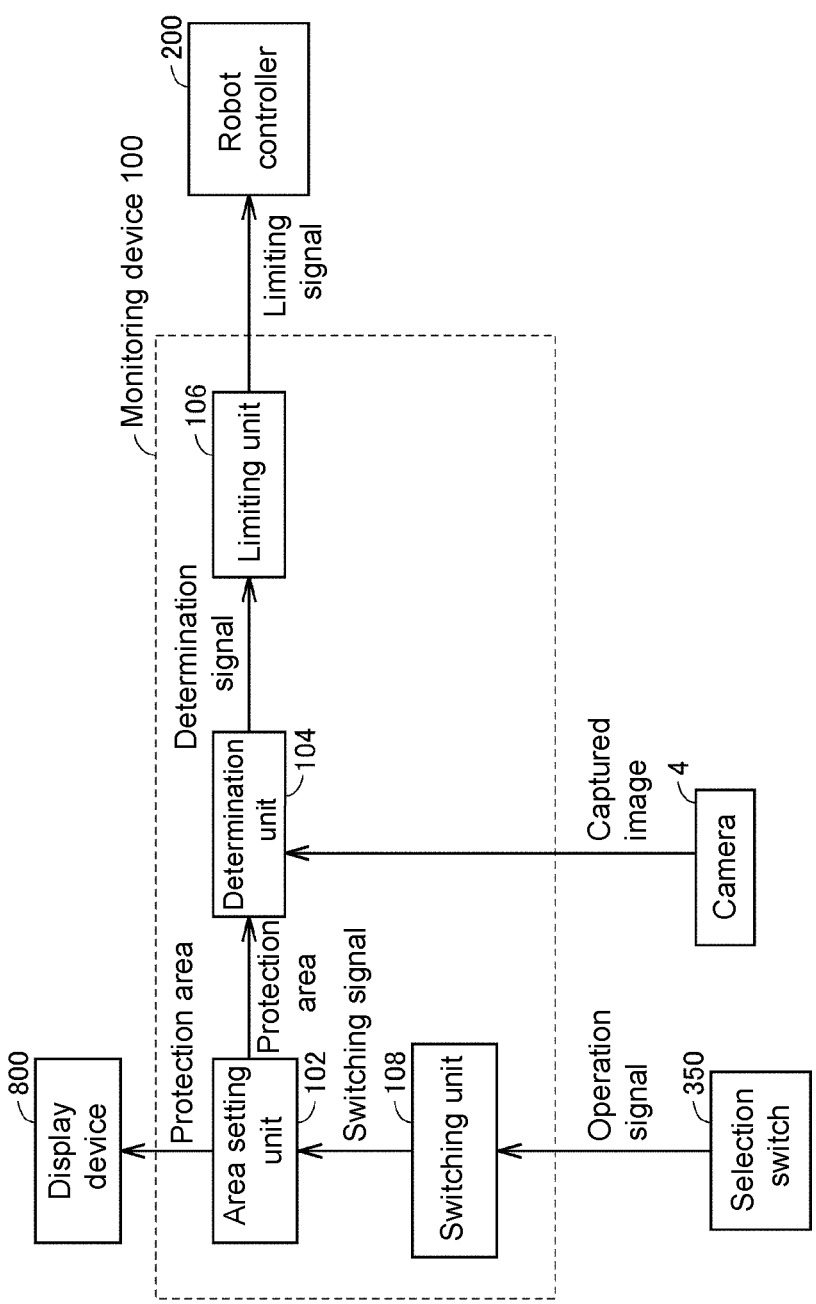
FIG. 6 is a diagram illustrating an example of a functional configuration of the monitoring device.

An example of a functional configuration of the monitoring device 100 will be described below. FIG. 6 is a diagram illustrating an example of a functional configuration of the monitoring device 100. The monitoring device 100 includes an area setting unit 102, a determination unit 104, a limiting unit 106, and a switching unit 108. The CPU 121 functions as the area setting unit 102, the determination unit 104, the limiting unit 106, and the switching unit 108 of the monitoring device 100.

The monitoring device 100 is connected to the display device 800, the selection switch 350, the camera 4, and a robot controller 200 that controls a motion of a robot. The area setting unit 102 sets at least one protection area to secure safe work of the worker 300 and the robot 400 in spatial coordinates which can be imaged by the camera 4. The number of protection areas which can be set by the area setting unit 102 according to this embodiment is two. The two protection areas include the worker protection area 602 and the robot protection area 604.

When the selection switch 350 is operated by the worker 300 or the like, an operation signal indicating the operation is transmitted from the selection switch 350 to the switching unit 108. The switching unit 108 transmits a switching signal to the area setting unit 102 when receiving the operation signal. When the area setting unit 102 receives the switching signal, the area setting unit 102 switches from the set protection area in the two protection areas to the other protection area. For example, when the area setting unit 102 sets the worker protection area 602 and the selection switch 350 is operated, the area setting unit 102 sets the robot protection area 604 (switches the set protection area to the robot protection area 604). When the area setting unit 102 sets the robot protection area 604 and the selection switch 350 is operated, the area setting unit 102 sets the worker protection area 602 (switches the set protection area to the worker protection area 602).

The area setting unit 102 transmits information indicating the set protection area to the display device 800 and the determination unit 104. The timing at which the area setting unit 102 transmits the information indicating the protection area can be set to the timing at which the protection area is switched. The captured image captured by the camera 4 is input to the determination unit 104. The determination unit 104 determines whether at least one of the worker 300 and the robot 400 intrudes into the protection area input from the area setting unit 102 by performing image processing on the captured images. The protection area input from the area setting unit 102 indicates a range of three-dimensional coordinates (x, y, z). Hereinafter, an example of the determination method will be described.

The determination unit 104 recognizes the worker 300 and the robot 400 in the captured image. As an example of the recognition method, features of the worker 300 and features of the robot 400 are stored as models in advance in the ROM 122. For example, the features of the worker 300 include a face of a person (the worker) and workwear worn by the worker. The features of the robot 400 include colors and shapes of the robot 400. The determination unit 104 calculates a coincidence level on the basis of a difference between the extracted features and the features stored in the ROM 122. For example, the coincidence level calculated by the determination unit 104 decreases as the difference increases, and the coincidence level calculated by the determination unit 104 increases as the difference decreases. The determination unit 104 recognizes a part (area) of the features of which the coincidence level is higher than a predetermined threshold value as the worker 300 or the robot 400. A method of specifying the worker 300 and the robot 400 is not limited thereto, and another method may be used.

The determination unit 104 specifies a range of coordinates (x, y, z) of the worker 300 and a range of coordinates (x, y, z) of the robot 400 by recognizing the worker 300 and the robot 400. When it is determined that at least a part of the specified range of coordinates of the worker 300 belongs to the range of coordinates of a protection area, the determination unit 104 determines that the worker 300 intrudes into the protection area. When it is determined that at least a part of the range of coordinates of the robot 400 belongs to the range of coordinates of a protection area, the determination unit 104 determines that the robot 400 intrudes into the protection area.

In this way, the determination unit 104 determines whether at least one of the worker 300 and the robot 400 intrudes into the protection area on the basis of the positions of the worker 300 and the robot 400 specified from the captured image captured by the camera 4. When the determination unit 104 determines that at least one of the worker 300 and the robot 400 intrudes into the protection area, the determination unit 104 transmits a determination signal indicating the intrusion to the limiting unit 106. When the determination unit 104 determines that neither the worker 300 nor the robot 400 intrudes into the protection area, the determination unit 104 does not transmit the determination signal to the limiting unit 106.

When the determination signal is received, the limiting unit 106 transmits a limiting signal to the robot controller 200. When the limiting signal is received, the robot controller 200 completely stops motions of all the robots in the work area α.

The display device 800 visually displays the protection area set by the area setting unit 102 on the basis of the protection area transmitted from the area setting unit 102.

<Flowchart of Monitoring System 1>

Figure 7:
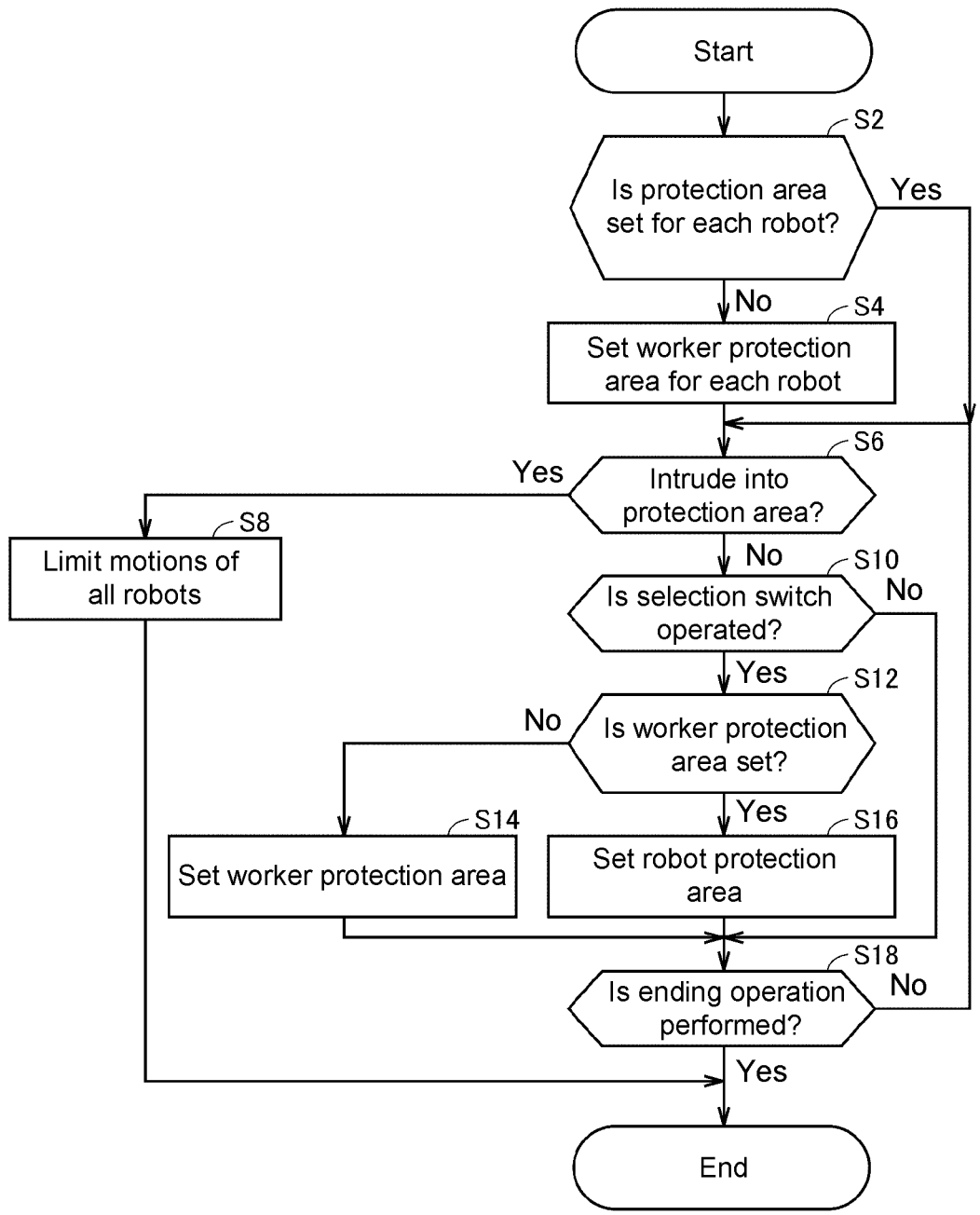
FIG. 7 is a diagram illustrating a flowchart of the monitoring system.

A flowchart of the monitoring device 100 will be described below with reference to FIG. 7. FIG. 7 is a diagram illustrating a flowchart of the monitoring system 1. When a starting operation for starting work in the work area α is performed by a manager of the work area α or the like, the routine illustrated in the flowchart of FIG. 7 is started. First, in S2, the area setting unit 102 determines whether a protection area is set for each robot in the work area α.

An example of the determination method will be described below. Protection area information indicating the protection area set by the area setting unit 102 is stored in the RAM 103. When the area setting unit 102 sets, for example, a worker protection area 602, worker protection area information capable of specifying the worker protection area 602 is stored in the RAM 103. When the area setting unit 102 sets, for example, a robot protection area 604, robot protection area information capable of specifying the robot protection area 604 is stored in the RAM 103. When the area setting unit 102 determines that the protection area information (one of the worker protection area information and the robot protection area information) is stored in the RAM 103, the determination result of S2 is YES. On the other hand, when the area setting unit 102 determines that the protection area information is not stored in the RAM 103, the determination result of S2 is NO. For example, when the protection area information is stored (remains) in the RAM 103 at the end of the work on the previous day, the determination result of S2 is YES. On the other hand, when protection area information is not stored (remains) in the RAM 103 at the end of the work on the previous day, the determination result of S2 is NO.

When the determination result of S2 is YES, the process of S4 is performed. On the other hand, when the determination result of S2 is NO, the process of S6 is performed. In S4, the area setting unit 102 sets the worker protection area as a default protection area. Accordingly, the worker 300 can smoothly start his or her work.

In S6, the determination unit 104 determines whether at least one of the worker 300 and the robot 400 intrudes into the protection area (either the protection area of the worker protection area 602 or the protection area of the robot protection area 604) set by the area setting unit 102. When the determination unit 104 determines that at least one of the worker 300 and the robot 400 intrudes into the protection area (YES in S6), the process of S8 is performed. When the determination unit 104 determines that neither the worker 300 nor the robot 400 intrudes into the protection area (NO in S6), the process of S10 is performed.

In S8, the limiting unit 106 limits the motions of all the robots 400 in the work area α (transmits the limiting signal to the robot controller 200). When the process of S8 is completed, the processing of the monitoring system 1 ends. In S10, the switching unit 108 determines whether the selection switch 350 is operated. When it is determined that the selection switch 350 is operated (YES in S10), the area setting unit 102 switches the set protection area. For example, when it is determined in S12 that the area setting unit 102 sets the worker protection area 602 (YES in S12), the area setting unit 102 sets the robot protection area 604 in S16. On the other hand, when it is determined that the area setting unit 102 sets the robot protection area 604 (NO in S12), the area setting unit 102 sets the worker protection area 602 in S14. When the processes of S14 and S16 are completed, the process of S18 is performed.

In S18, it is determined whether an ending operation is performed. Here, the ending operation is an operation which is performed by a manager of the work area α or the like when work in the work area α ends. If the determination result of S18 is NO, the process returns to S6. On the other hand, if the determination result of S18 is YES, the processing of the monitoring device 100 ends.

<Advantages of First Embodiment>

Advantages of the first embodiment will be described below. The monitoring system 1 according to the first embodiment can detect intrusion of the worker 300 and the robot 400 into the protection area using the camera 4. Accordingly, for example, even when a plurality of common areas in which a worker can work around a robot are provided, it is possible to facilitate designing of a working environment in which a common area 600A in which the work area of the worker 300 and the work area of the robot 400 overlap is present (such as arrangement of the robot 400 in the work area α). In this embodiment, a safety fence for separating the work area α from an area other than the work area α is not necessary. Accordingly, in comparison with a monitoring system requiring the safety fence, it is possible to reduce facility costs of a work line.

In the monitoring system 1 according to the first embodiment, the protection area can be switched between the worker protection area 602 and the robot protection area 604. Accordingly, it is possible to guarantee safety of the worker 300 in any case of a case in which the worker 300 works and a case in which the robot 400 works.

The monitoring system 1 switches the protection area by allowing the worker 300 or the like to operate the selection switch 350. Accordingly, since the protection area can be switched depending on a work pace of the worker 300, it is possible to enhance convenience of the worker 300.

Second Embodiment

Figure 8:
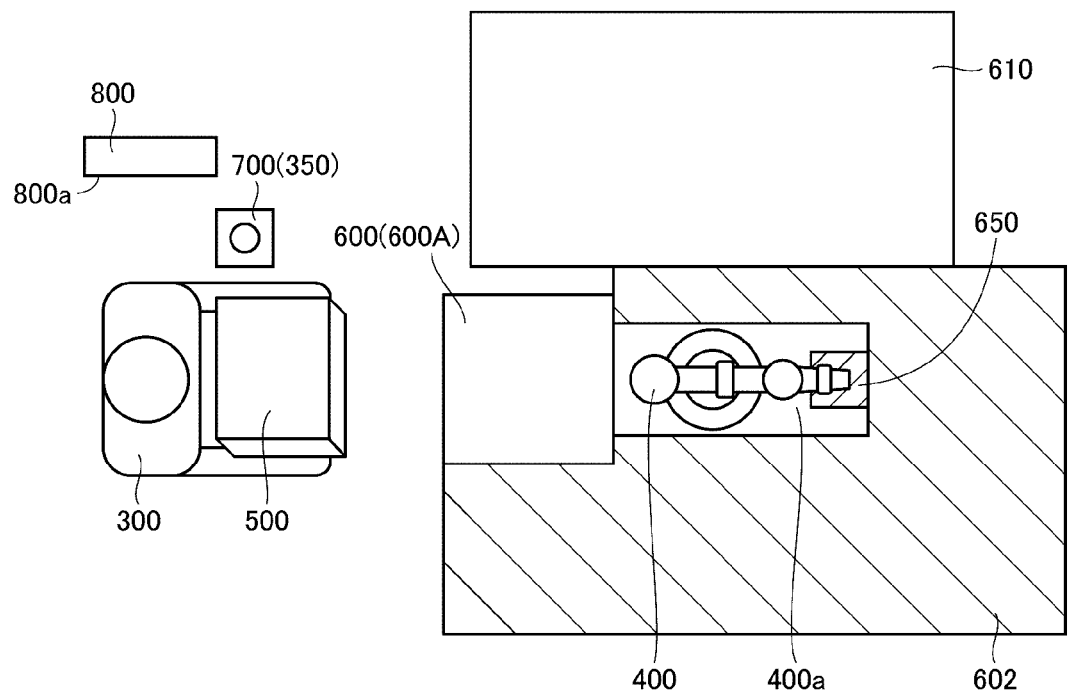
FIG. 8 is a diagram illustrating a worker protection area according to a second embodiment.
Figure 9:
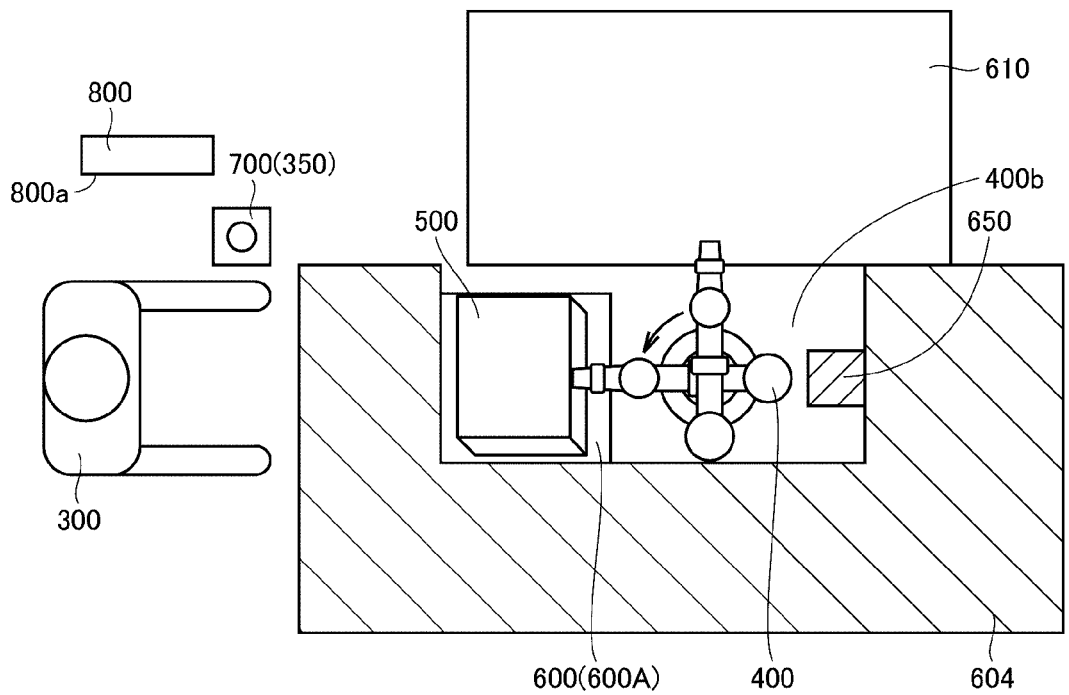
FIG. 9 is a diagram illustrating a robot protection area according to the second embodiment.

A monitoring system 2 including a monitoring device according to a second embodiment will be described below. FIG. 8 is a diagram illustrating a worker protection area 602 according to the second embodiment. FIG. 9 is a diagram illustrating a robot protection area 604 according to the second embodiment. The configuration example of the monitoring system 2 is the same as that illustrated in FIG. 1.

Comparing the monitoring system 2 with the monitoring system 1, as illustrated in FIGS. 8 and 9, the monitoring system 2 is different from the monitoring system 1 in that a detection area 650 is provided and a robot start switch 700 is provided instead of the selection switch 350.

In the example illustrated in FIG. 8, the worker 300 holds a work object 500. The robot 400 is present at an initial position. The worker 300 places the work object 500 on the work table 600 and then the worker 300 operates the robot start switch 700. When the robot start switch 700 is operated by the worker 300 or the like and the worker protection area 602 is set, the protection area is switched to the robot protection area 604 and the robot 400 starts movement. When the robot start switch 700 is operated by the worker 300 or the like and the robot protection area 604 is set, setting of the robot protection area 604 is maintained. When the robot start switch 700 is operated by the worker 300 or the like during work of the robot 400, the work of the robot is continuously performed.

In the example illustrated in FIG. 9, the robot 400 processes the work object 500 placed on the work table 600. Thereafter, when the processing of the robot 400 ends, the robot 400 is returned to the initial position. Here, the detection area 650 is provided at a position which is included in an area of the robot 400 present at the initial position. That is, when the robot 400 is present at the initial position, the robot 400 is present in the detection area 650. When it is determined that the robot 400 is present in the detection area 650 and the robot protection area 604 is set, the worker protection area 602 is set. When it is determined that the robot 400 is present in the detection area 650 and the worker protection area 602, setting of the worker protection area 602 is maintained.

In this way, in the second embodiment, switching from the worker protection area 602 to the robot protection area 604 is performed with the operation of the robot start switch 700 as a trigger, and switching from the robot protection area 604 to the worker protection area 602 is performed with presence of the robot 400 in the detection area 650 (at the initial position) as a trigger.

Figure 10:
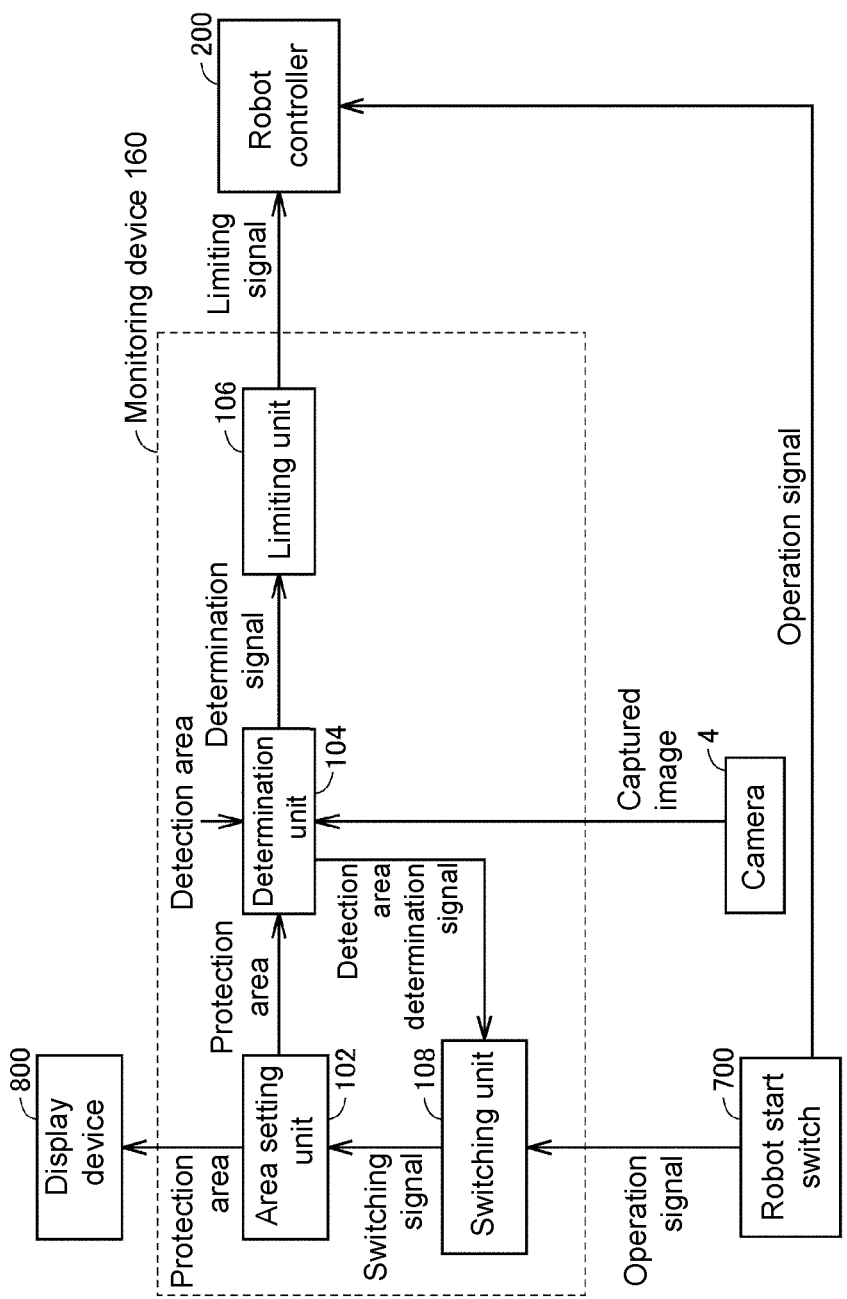
FIG. 10 is a diagram illustrating an example of a functional configuration of a monitoring device according to the second embodiment.

FIG. 10 is a diagram illustrating an example of a functional configuration of a monitoring device 160 according to the second embodiment. An example of the functional configuration of the monitoring device 160 will be described below with reference to FIG. 10. In description with reference to FIG. 10, differences from the description with reference to FIG. 6 will be mainly described.

When the robot start switch 700 is operated, an operation signal indicating the operation is transmitted from the robot start switch 700 to the switching unit 108 and the robot controller 200. When the operation signal is received, the robot controller 200 causes the robot 400 to start a motion corresponding to the operated robot start switch. When the determination unit 104 determines that the robot 400 is present in the detection area 650 on the basis of the captured images, a detection area determination signal indicating the determination result is transmitted to the switching unit 108. The range of coordinates (x, y, z) of the detection area 650 is determined in advance and is stored in a predetermined memory area (for example, the RAM 103).

When the detection area determination signal is received, the switching unit 108 switches the set robot protection area 604 to the worker protection area 602 by transmitting a switching signal to the area setting unit 102.

Figure 11:
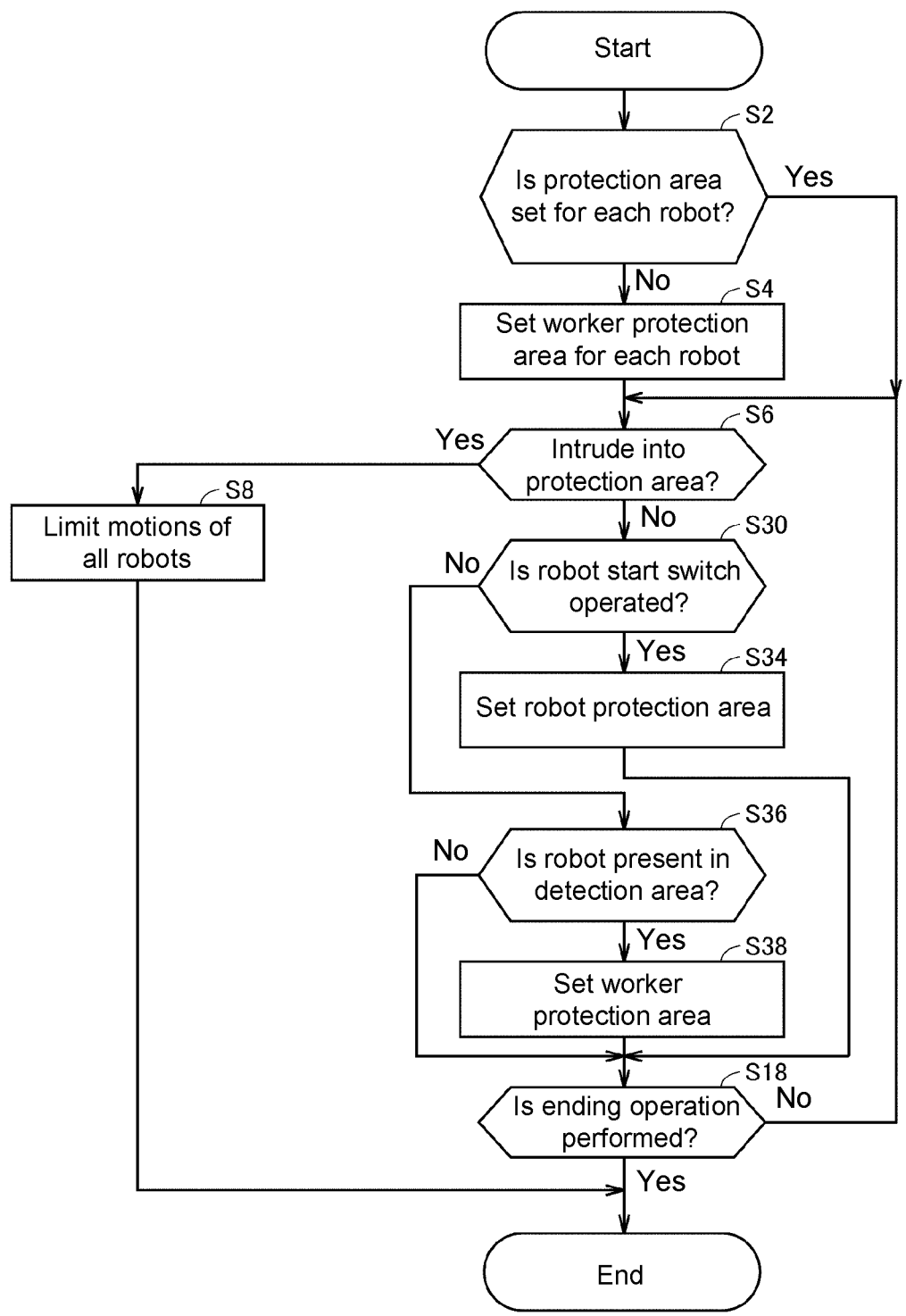
FIG. 11 is a diagram illustrating a flow chart of a monitoring system according to the second embodiment.

FIG. 11 is a diagram illustrating a flowchart of the monitoring system 2 according to the second embodiment. When the determination result of S6 is NO, S30 is performed. In S30, the switching unit 108 determines whether the robot start switch 700 is operated. When the switching unit 108 determines that the robot start switch 700 is operated (YES in S30), S34 is performed. On the other hand, when the switching unit 108 determines that the robot start switch 700 is not operated (NO in S30), S36 is performed.

In S34, in the case where the worker protection area 602 is set, the area setting unit 102 switches the protection area to the robot protection area 604. In S34, in the case where the robot protection area 604 is set, the area setting unit 102 maintains setting of the robot protection area 604. When the process of S34 is completed, S18 is performed.

In S36, the determination unit 104 determines whether the robot 400 is present in the detection area 650 after the motion of the robot 400 is completed (the work of the robot is completed). That is, in S36, after the work of the robot 400 is completed, it is determined whether the robot 400 is returned to the detection area 650. When the determination unit 104 determines that the robot 400 is present in the detection area 650 (YES in S36), S38 is performed. When the determination unit 104 determines that the robot 400 has left the detection area 650 (NO in S36), S18 is performed.

In S38, in the case where the robot protection area 604 is set, the area setting unit 102 switches the protection area to the worker protection area 602. In S38, in the case where the worker protection area 602 is set, the area setting unit 102 maintains setting of the worker protection area 602.

In the monitoring system 2 according to the second embodiment, when the robot 400 returns to the initial position after the processing of the robot 400 is completed, the robot 400 is present in the detection area 650. When it is determined that the robot 400 is present in the detection area 650, the robot protection area 604 is switched to the worker protection area 602. In this way, in the monitoring system 2 according to the second embodiment, when the processing of the robot 400 is completed, the robot protection area 604 is automatically switched to the worker protection area 602 without the operation of the worker 300. Accordingly, it is possible to enhance convenience of the worker 300.

Third Embodiment

A monitoring system 3 including a monitoring device according to a third embodiment will be described below. The configuration example of the monitoring system 3 is the same as illustrated in FIG. 1. In the monitoring system 3, the selection switch 350 described in the first embodiment and the detection area 650 are combined. Regarding the worker protection area 602 and the robot protection area 604 in the third embodiment, the robot start switch 700 illustrated in FIGS. 8 and 9 is replaced with the selection switch 350.

In the third embodiment, when the robot 400 is present in the detection area 650 as illustrated in FIG. 8 (for example, when the robot 400 is present at the initial position and thus does not perform work) and the selection switch 350 is operated, the protection area is switched. On the other hand, when the robot 400 has left the detection area 650 as illustrated in FIG. 9 (for example, when the robot 400 is working) and the selection switch 350 is operated, the protection area is not switched.

Figure 12:
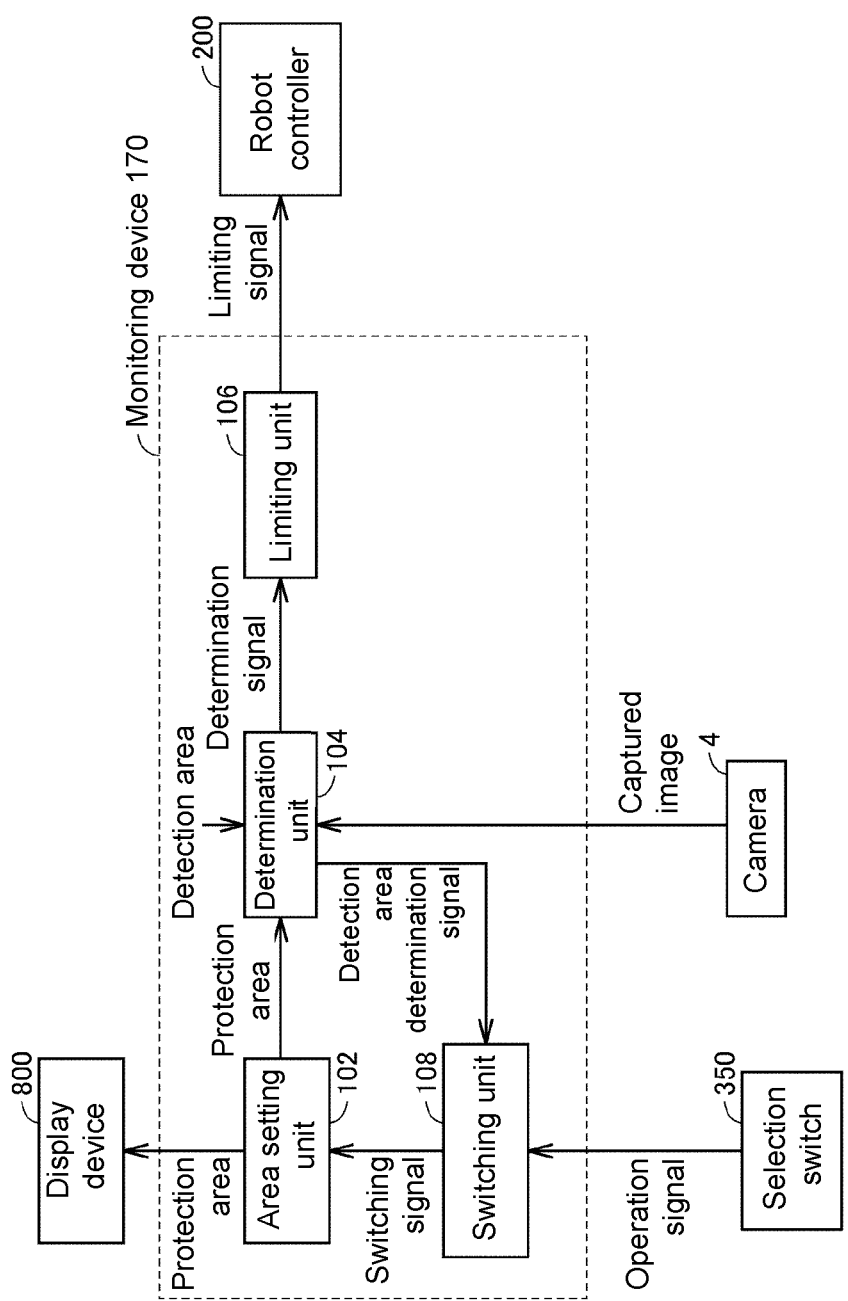
FIG. 12 is a diagram illustrating an example of a functional configuration of a monitoring device according to a third embodiment.

FIG. 12 illustrates an example of a functional configuration of a monitoring device 170 according to the third embodiment. When the determination unit 104 determines that the robot 400 is present in the detection area 650 and the selection switch 350 is operated, the switching unit 108 causes the area setting unit 102 to switch the protection area. On the other hand, when the determination unit 104 determines that the robot 400 has left the detection area 650 and the selection switch 350 is operated, the switching unit 108 does not cause the area setting unit 102 to switch the protection area (stops switching of the protection area).

Figure 13:
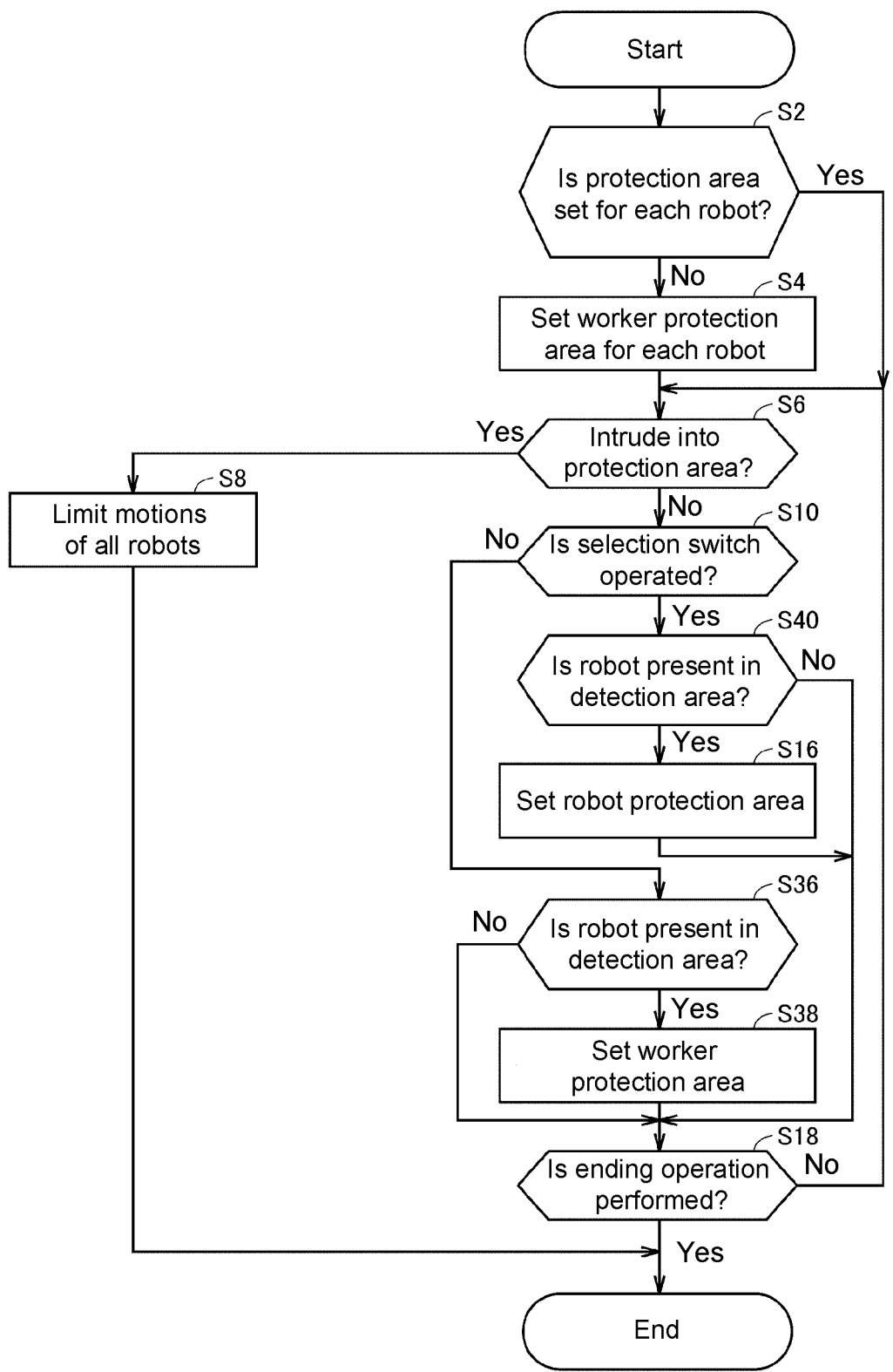
FIG. 13 is a diagram illustrating a flow chart of a monitoring system according to a third embodiment.

FIG. 13 is a diagram illustrating a flowchart of the monitoring system 3 according to the third embodiment. In S10, the switching unit 108 determines whether the selection switch 350 is operated. When it is determined that the selection switch 350 is operated (YES in S10), S40 is performed.

In S40, the determination unit 104 determines whether the robot 400 is present in the detection area 650. When it is determined in S40 that the robot is present in the detection area 650 (YES in S40), the worker protection area 602 is already set and thus the area setting unit 102 sets the robot protection area 604 in S16. In S16, the area setting unit 102 sets the worker protection area 602 when the robot protection area 604 is already set. When the process of S16 is completed, S18 is performed. When it is determined in S40 that the robot has left the detection area 650 (NO in S40), that is, when there is a high likelihood that the robot 400 will be working or the robot protection area 604 would be set, switching of the protection area is not performed (the protection area is not switched to the worker protection area 602) and the process of S18 is performed.

Advantages of the monitoring system 3 according to the third embodiment will be described below. When the protection area is switched to the worker protection area in a state in which the selection switch 350 is operated and the robot 400 has left the detection area 650 (for example, in a state in which the robot 400 is working as illustrated in FIG. 9), the worker can intrude into the worker protection area. Then, there is a likelihood that the worker 300 intruding into the worker protection area will collide with the robot 400 in work. On the contrary, in the monitoring system 1 according to the third embodiment, when the robot 400 has left the detection area 650 (for example, when there is a high likelihood that the robot 400 will be working as illustrated in FIG. 9), the protection area is not switched (setting of the robot protection area is maintained without switching to the worker protection area) in a state in which the selection switch 350 is operated. Accordingly, since the worker 300 can prevent collision with the robot 400 under operation, it is possible to enhance safety of the worker 300.

The monitoring system 3 switches the protection area by allowing the worker 300 or the like to operate the selection switch 350. Accordingly, since the protection area can be switched depending on a work pace of the worker 300, it is possible to enhance convenience of the worker 300.

The monitoring system 3 automatically switches the robot protection area 604 to the worker protection area 602 without the operation of the worker 300 when the processing of the robot 400 is completed. Accordingly, it is possible to enhance convenience of the worker 300.

[Areas]

Figure 14:
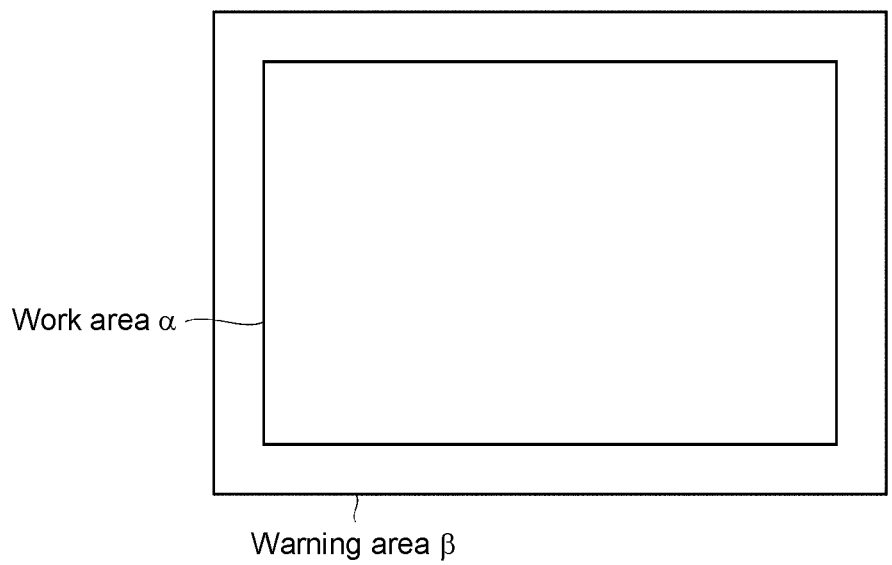
FIG. 14 is a diagram illustrating areas including a work area.

An area provided outside the work area α will be described below. FIG. 14 is a diagram illustrating areas including the work area α or the like. In the example illustrated in FIG. 14, the areas are viewed from the upper side. As described above, protection areas for all robots 400 installed in the work area α are included in the work area α. In the example illustrated in FIG. 14, a warning area β is provided as an area including the work area α. The warning area β is an area which is used to issue a warning about intrusion of the worker 300 into the protection area (the work area α) in spatial coordinates which can be recognized by the camera 4. When the determination unit 104 determines that the worker 300 intrudes into the warning area β, a warning device (not illustrated) issues a warning about intrusion into the warning area β. The issuing of the warning includes, for example, at least one of a warning sound output process and a warning message display process.

In this way, by virtually providing the warning area β outside the work area α, it is possible to enhance safety in the work area α. The idea illustrated in FIG. 14 can be applied to the monitoring system according to at least one of the first to third embodiments.

MODIFIED EXAMPLES

While embodiments of the present invention have been described above with reference to the drawings, the present invention is not limited to the embodiments. The present invention is not limited to the above-mentioned embodiments, but can be modified and applied in various forms. Possible modified examples of the present invention will be described below.

[Trigger to Switch Protection Area]

A monitoring system 4 including a monitoring device according to a modified example will be described below. The configuration example of the monitoring system 4 is the same as illustrated in FIG. 1. In the above-mentioned embodiments, an operation of the selection switch 350, presence of the robot 400 in the detection area 650, and the like have been exemplified as the trigger to switch the protection area. However, another trigger may be used as the trigger to switch the protection area. For example, a position of a worker may be used as the trigger to switch the protection area.

Figure 15:
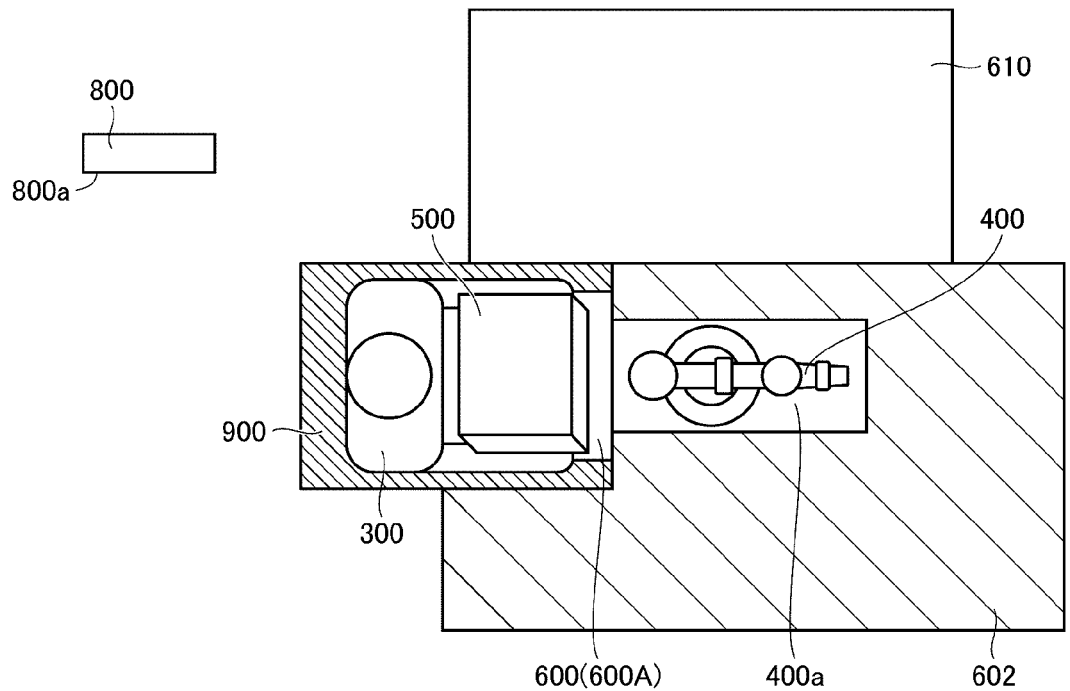
FIG. 15 is a diagram illustrating a worker protection area according to a modified example.
Figure 16:
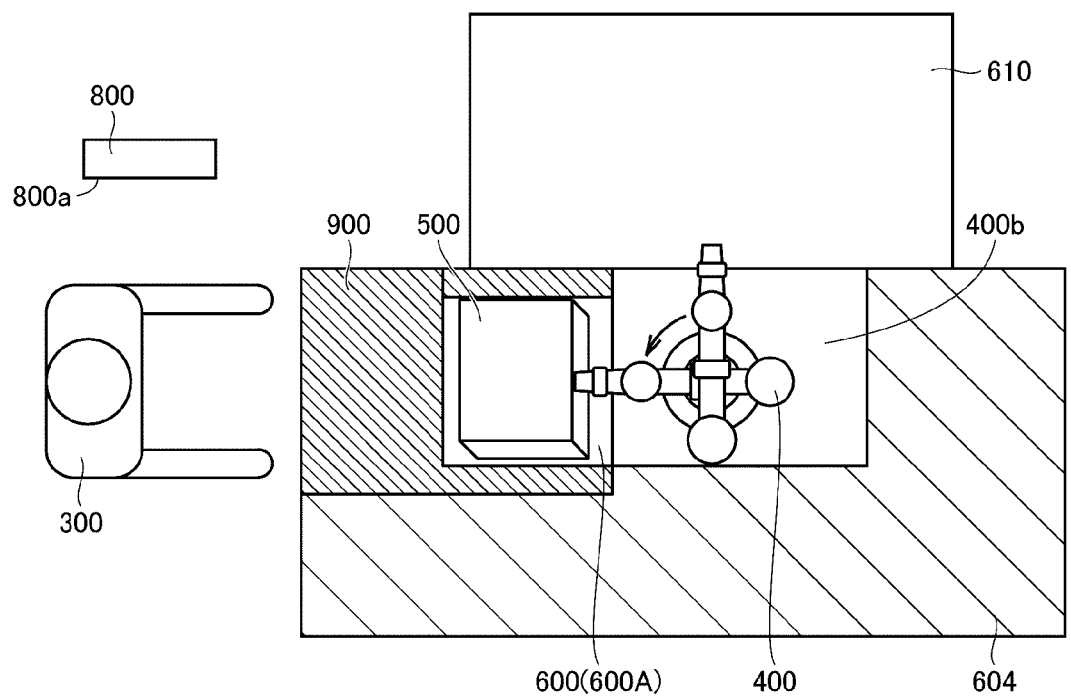
FIG. 16 is a diagram illustrating a robot protection area according to a modified example.

FIG. 15 is a diagram illustrating an example of a worker protection area 602 according to this modified example. FIG. 16 is a diagram illustrating an example of a robot protection area 604 according to this modified example. As illustrated in FIGS. 15 and 16, a worker area 900 which is an area in which the worker 300 works is determined. The worker area 900 is an area in which the worker 300 is present when the worker 300 is working and is, for example, an area in the vicinity of the work table 600. As illustrated in FIG. 16, the worker area 900 overlaps a part of the robot protection area 604. As illustrated in FIGS. 15 and 16, the selection switch 350 is removed.

In this modified example, when the worker 300 intrudes into the worker area 900 as illustrated in FIG. 15, the protection area is switched to the worker protection area 602. At this time, the motion of the robot 400 is stopped if the robot 400 is moving, and stoppage of the robot 400 is maintained if the robot 400 is stopped.

When the worker 300 has left the worker area 900 as illustrated in FIG. 16, the protection area is switched to the robot protection area 604. At this time, if the robot 400 is stopped and there is a process to be performed by the robot 400, the robot 400 starts performing the process.

Figure 17:
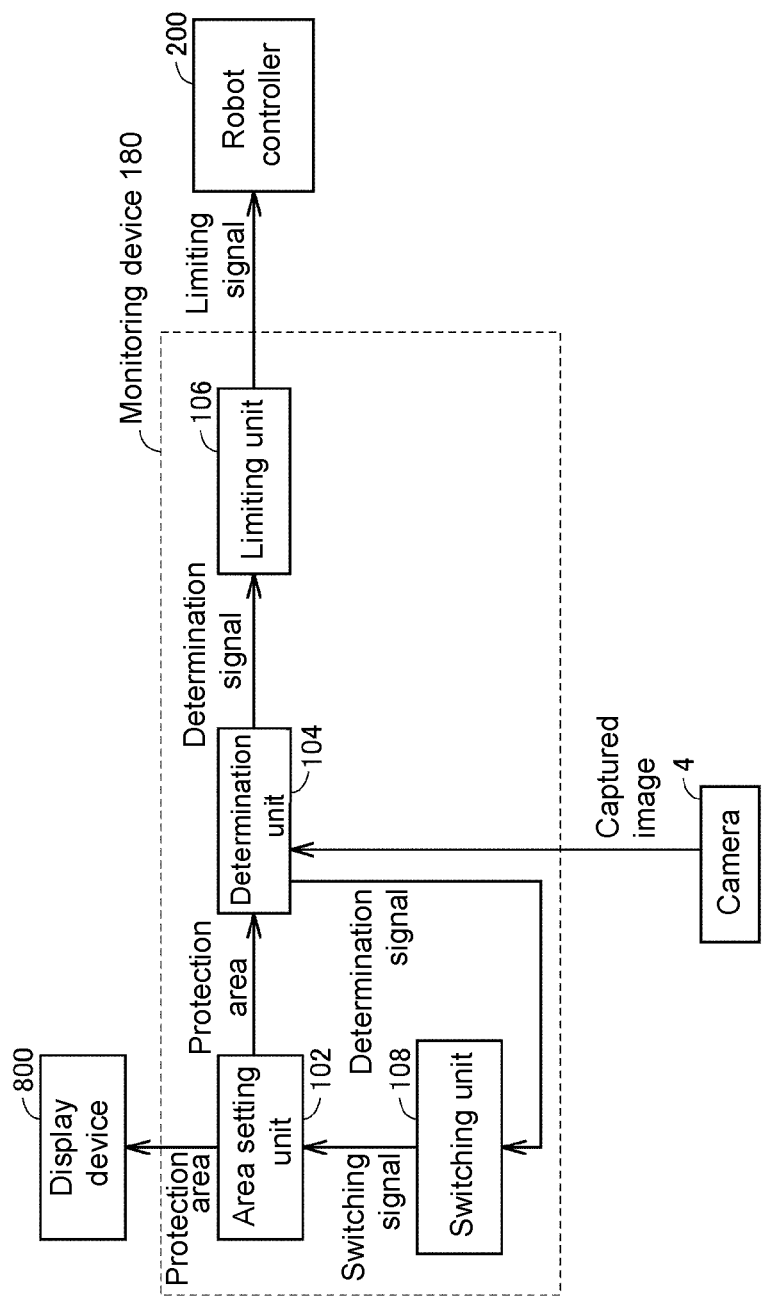
FIG. 17 is a diagram illustrating an example of a functional configuration of a monitoring device according to a modified example.

FIG. 17 is a diagram illustrating an example of a functional configuration of a monitoring device 180 according to this modified example. FIGS. 17 and 6 are the same, except that the selection switch 350 is removed and a determination signal is transmitted from the determination unit 104 to the switching unit 108.

The determination unit 104 determines whether the worker 300 intrudes into the worker area 900, that is, whether a state in which the worker 300 has left the worker area 900 is changed to a state in which the worker 300 is present in the worker area 900, on the basis of the position of the worker 300 specified using the camera 4. When the determination unit 104 determines that the worker 300 intrudes into the worker area 900, a determination signal indicating that the worker 300 intrudes into the worker area 900 is transmitted to the switching unit 108. When the determination signal is received, the switching unit 108 transmits a switching signal to the area setting unit 102.

The determination unit 104 determines whether the worker 300 has left the worker area 900, that is, whether a state in which the worker 300 is present in the worker area 900 is changed to a state in which the worker has left the worker area 900. When the determination unit 104 determines that the worker 300 has left the worker area 900, a determination signal indicating that the worker 300 has left the worker area 900 is transmitted to the switching unit 108. When the determination signal is received, the switching unit 108 transmits a switching signal to the area setting unit 102.

Figure 18:
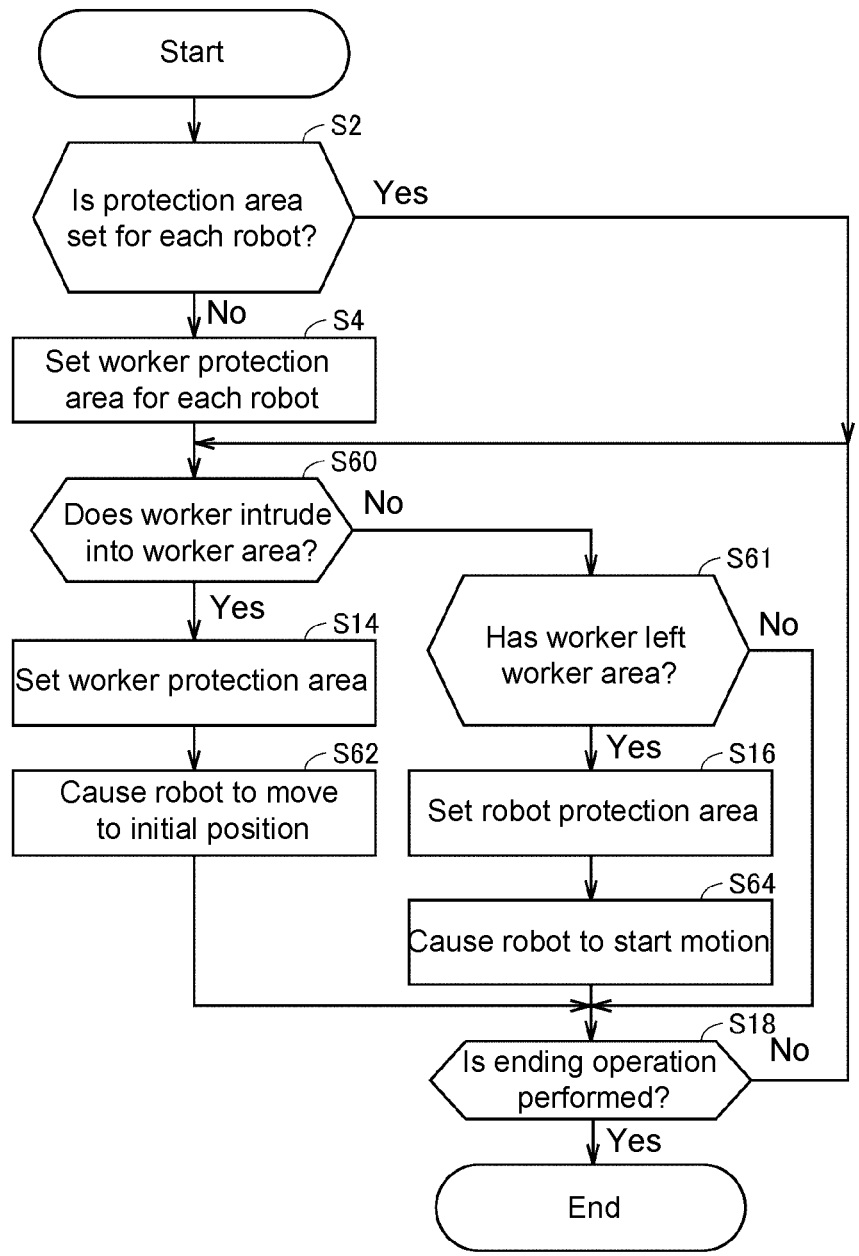
FIG. 18 is a diagram illustrating a flowchart of a monitoring system according to a modified example.

A flowchart of the monitoring system 4 will be described below with reference to FIG. 18. FIG. 18 is a diagram illustrating a flowchart of the monitoring system 4. In FIG. 18, when the process of S4 is completed, S60 is performed. In S60, the determination unit 104 determines whether the worker 300 intrudes into the worker area 900. When the determination result of S60 is YES, S14 is performed. When the process of S14 is completed, the monitoring device 180 (for example, the limiting unit 106) moves the robot 400 to the initial position in S62 (see FIG. 15). In S62, when the robot 400 is present at the initial position, control to the initial position of the robot 400 is maintained. When the process of S62 is completed, S18 is performed.

When the determination result of S60 is NO, S61 is performed. In S61, it is determined whether the worker 300 has left the worker area 900. When the determination result of S61 is YES, S16 is performed. When the process of S16 is completed, S64 is performed. In S64, when the robot 400 is stopped and there is a process to be performed by the robot 400, the robot 400 starts performing the process (starts movement). In S64, when the robot 400 moves, movement of the robot 400 is maintained. In S64, when the robot 400 is stopped and there is no process to be performed by the robot 400, stoppage of the robot 400 is maintained.

According to the configuration of this modified example, when the determination unit 104 determines that the worker 300 intrudes into the worker area 900 (YES in S60), the protection area is automatically switched to the worker protection area without the operation of the worker 300 (S14). Accordingly, it is possible to enhance safety of the worker 300 and to improve convenience of the worker 300. When the determination unit 104 determines that the worker 300 has left the worker area 900 (YES in S61), the protection area is switched to the robot protection area (S16). Accordingly, since the protection area is automatically switched to the robot protection area without the operation of the worker 300, it is possible to enhance a work efficiency (a working rate) of the robot 400 and to improve convenience of the worker 300.

[Number of Protection Areas]

In the above-mentioned embodiments, the number of protection areas is two including the worker protection area 602 and the robot protection area 604. However, the number of protection areas may be one or three or more. When the number of protection areas is one, for example, one of the worker protection area 602 and the robot protection area 604 may be used. In consideration of safety, it is preferable that the one protection area is the robot protection area 604.

A configuration in which the number of protection areas is three or more will be described below. When such a configuration is employed, for example, a plurality of types of worker protection areas 602 may be provided. The area setting unit 102 sets a worker protection area corresponding to a type of work of the worker among the plurality of types of worker protection areas 602. For example, a configuration in which an area into which the worker can intrude differs will be described depending on the type of work performed by the worker. In a monitoring system employing such a configuration, the area setting unit 102 sets a first worker protection area corresponding to first work when the worker 300 performs the first work, and the area setting unit 102 sets a second worker protection area corresponding to second work when the worker 300 performs the second work. The first worker protection area and the second worker protection are will be described with reference to FIG. 3. For example, the first worker protection area is the worker protection area 602 illustrated in FIG. 3, and the second worker protection area is an area excluding an area below the work table 600 from the worker protection area 602 illustrated in FIG. 3.

In the configuration in which the number of protection areas is three or more, a plurality of types of robot protection areas 604 may be provided. The area setting unit 102 sets a robot protection area corresponding to a type of work of the robot 400 among the plurality of types of robot protection areas 604. For example, a configuration in which an area into which at least a part of the robot can intrude differs will be described depending on the type of work performed by the robot. In a monitoring system employing such a configuration, the area setting unit 102 sets a first robot protection area corresponding to first work when the robot 400 performs the first work, and the area setting unit 102 sets a second robot protection area corresponding to second work when the robot 400 performs the second work. The first robot protection area and the second robot protection will be described with reference to FIG. 5. For example, the first robot protection area is the robot protection area 604 illustrated in FIG. 5, and the second robot protection area is an area excluding a right end area from the robot protection area 604 illustrated in FIG. 5.

In this way, by virtually setting at least one protection area of the worker protection area and the robot protection area to a plurality of types, the monitoring system according to this modified example can perform more detailed protection area setting.

[Limiting of Motion of Robot]

(1) In the above-mentioned embodiments, it has been described that motions of all the robots in the work area α are limited when it is determined that at least one of the worker 300 and the robot 400 intrudes into a set protection area. However, when it is determined that at least one of the worker 300 and the robot 400 intrudes into a set protection area, only the motion of the robot 400 corresponding to the protection area may be limited. According to this configuration, since only the motion of the corresponding robot 400 is limited and motions of the other robots 400 are not limited, it is possible to enhance a work efficiency in the work area α in comparison with the case in which the motions of all the robots 400 are limited.

(2) In the above-mentioned embodiments, it has been described that limiting of the robot 400 involves completely stopping the motion of the robot 400. However, limiting of the robot 400 may involve decreasing a motion speed of the robot 400.

[Case in which the Robot is Movable]

The present invention can be applied to a case in which at least one robot of robots in the work area α is movable. For example, when a worker and a mobile robot work in cooperation with each other and a trigger to switch the worker protection area to the robot protection area is satisfied, the area setting unit may detect coordinates of the position of the mobile robot and set the robot protection area on the basis of the detected coordinates. Parameters for converting the robot protection area from the coordinates may be determined in advance and stored in a predetermined memory area (for example, the RAM 103). Even in a monitoring system employing this configuration, the above-mentioned advantages of the embodiments can be achieved.

[Others]

The processing in the monitoring device is realized by hardware and software which is executed by the CPU 121. This software may be stored in a flash memory in advance. The software may be stored in another recording medium such as a memory card and may be distributed as a program product. Alternatively, the software may be provided as a downloadable program product by an information provider connected to a so-called Internet. The software is read from the recording medium by an IC card reader/writer or another reader or is downloaded via a communication IF and temporarily stored in a flash memory. The software is read from the flash memory by the CPU 121 and is stored in an executable program format in the flash memory. The CPU 121 executes the program.

Elements constituting the monitoring device 100 illustrated in FIG. 2 are general ones. Accordingly, an essential part of the present invention can be said to be software stored in a recording medium such as a flash memory or a memory card or software which is downloadable via a network.

The recording medium is not limited to DVD-ROM, CD-ROM, FD (Flexible Disk), hard disk and may be a medium which fixedly store a program such as a magnetic tape, a cassette tape, an optical disc (magnetic optical disc (MO)/minidisc (MD)/digital versatile disc (DVD)), an optical memory card, a semiconductor memory such as a mask ROM, an electronically programmable read-only memory (EPROM), an electronically erasable Programmable read-only memory (EEPROM), or a flash ROM in addition to a DVD-ROM, a CD-ROM, a flexible disk (FD), and a hard disk. The recording medium is a non-transitory medium of which the program can be read by a computer.

A program mentioned herein includes a program which can be directly executed by a CPU, a program of a source program format, a compressed program, an encrypted program, and the like.

The above-disclosed embodiment should be understood to be merely exemplary, but not restrictive in all respects. The scope of the present invention is defined by the appended claims, not by the above description, and is intended to include all modifications within meanings and scopes equivalent to the claims.

What is claimed is:

1. A monitoring system having a monitoring device that monitors motions of a worker and a robot so that work is performed safely, the monitoring system comprising:
   at least one three-dimensional detection unit, configured to specify positions of the worker and the robot in a three-dimensional space;
   an area setting unit, configured to set at least one protection area to secure safe work of the worker and the robot in spatial coordinates which are recognizable by the three-dimensional detection unit;
   a determination unit, configured to determine whether at least one of the worker and the robot intrudes into the protection area on the basis of the positions of the worker and the robot specified by the three-dimensional detection unit;
   a limiting unit, configured to limit the motion of the robot when the determination unit determines that at least one of the worker and the robot intrudes into the protection area; and
   a switching unit, configured to switch the protection area for executing the determination from a plurality of protection areas when the area setting unit sets the plurality of protection areas,
   wherein the area setting unit is configured to set the protection area when the worker works in a common area in which a work area of the worker and a work area of the robot overlap and set the protection area when the robot works in the common area.

2. The monitoring system according to claim 1, further comprising:
   a selection switch, configured to select the protection area for executing the determination among the plurality of set protection areas,
   wherein the switching unit switches the protection area for executing the determination on the basis of the selection switch.

3. The monitoring system according to claim 1, further comprising:
   a detection area setting unit, configured to set a detection area for detecting the position of the robot in the spatial coordinates which are recognizable by the three-dimensional detection unit,
   wherein the determination unit determines whether the robot is in the detection area on the basis of the position of the robot specified by the three-dimensional detection unit, and
   the switching unit switches the protection area for executing the determination when the determination unit determines that the robot is located in the detection area.

4. The monitoring system according to claim 2, further comprising:
   a detection area setting unit, configured to set a detection area for detecting the position of the robot in the spatial coordinates which are recognizable by the three-dimensional detection unit,
   wherein the determination unit determines whether the robot is in the detection area on the basis of the position of the robot specified by the three-dimensional detection unit, and
   the switching unit stops switching of the protection area when the selection switch is operated but the determination unit determines that the robot is not located in the detection area.

5. The monitoring system according to claim 1, wherein the determination unit determines whether the worker is in the work area of the worker on the basis of the position of the worker specified by the three-dimensional detection unit, and
   the switching unit switches the protection area for executing the determination when the determination unit determines that the worker is in the work area of the worker.

6. The monitoring system according to claim 5, wherein the switching unit switches the protection area for executing the determination when the determination unit determines that the worker is not located in the work area of the worker.

7. The monitoring system according to claim 1, further comprising:
   a warning area setting unit, configured to set a warning area for giving a warning about intrusion of the worker into the protection area outside the protection area in the spatial coordinates which are recognizable by the three-dimensional detection unit.

8. The monitoring system according to claim 1, further comprising:
   a display unit, configured to visually display the protection area set by the area setting unit.

9. A monitoring device that monitors motions of a worker and a robot so that work is performed safely, the monitoring device comprising:
   an area setting unit, configured to set at least one protection area to secure safe work of the worker and the robot in spatial coordinates which are recognizable by at least one three-dimensional detection unit configured to specify positions of the worker and the robot in a three-dimensional space;
   a determination unit, configured to determine whether at least one of the worker and the robot intrudes into the protection area on the basis of the positions of the worker and the robot specified by the three-dimensional detection unit;
   a limiting unit, configured to limit the motion of the robot when the determination unit determines that at least one of the worker and the robot intrudes into the protection area; and
   a switching unit, configured to switch the protection area for executing the determination from a plurality of protection areas when the area setting unit sets the plurality of protection areas,
   wherein the area setting unit is configured to set the protection area when the worker works in a common area in which a work area of the worker and a work area of the robot overlap and set the protection area when the robot works in the common area.

10. A monitoring method of monitoring motions of a worker and a robot so that work is performed safely, the monitoring method comprising:
    setting at least one protection area to secure safe work of the worker and the robot in spatial coordinates which are recognizable by at least one three-dimensional detection unit configured to specify positions of the worker and the robot in a three-dimensional space;
    determining whether at least one of the worker and the robot intrudes into the protection area on the basis of the positions of the worker and the robot specified by the three-dimensional detection unit;
    limiting the motion of the robot when it is determined that at least one of the worker and the robot intrudes into the protection area; and switching the protection area for executing the determination from a plurality of protection areas when the plurality of protection areas are set,
wherein the protection area for the worker is set when the worker works in a common area in which a work area of the worker and a work area of the robot overlap and the protection area for the robot is set when the robot works in the common area.

\* \* \* \* \*